April 10, 1928.
H. WALKER
1,665,336
MOTOR VEHICLE BUMPER AND MOUNTING THEREFOR
Filed June 25, 1927
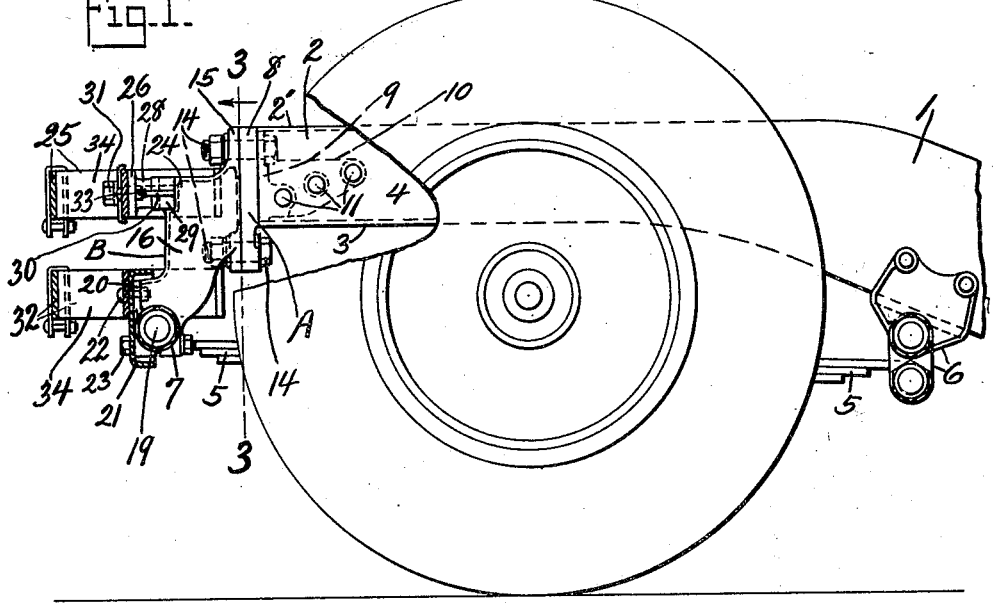
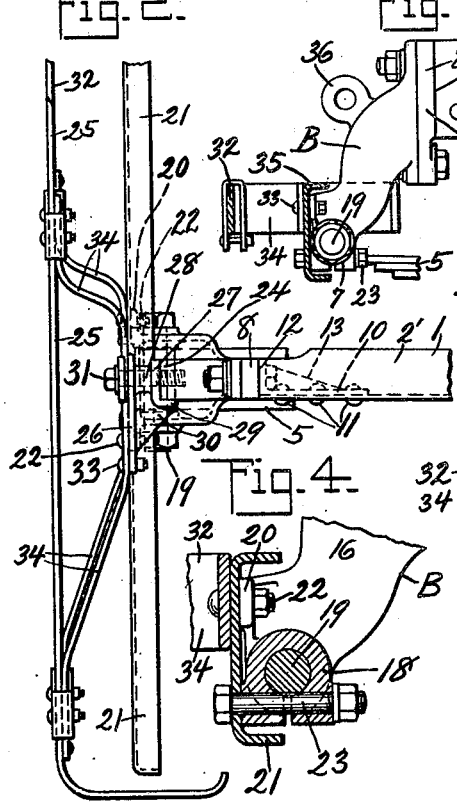
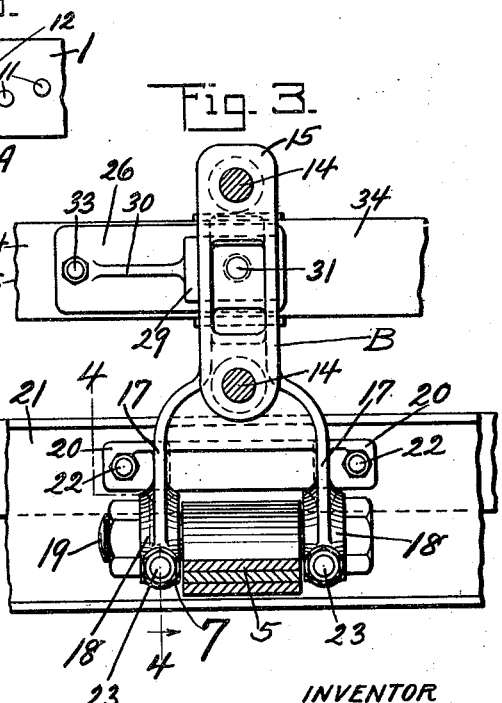
INVENTOR
Hubert Walker
BY F. H. Gibbs
ATTORNEY Patented Apr. 10, 1928.

1,665,336

UNITED STATES PATENT OFFICE.

HUBERT WALKER, OF ROYAL OAK, MICHIGAN, ASSIGNOR TO AMERICAN CAR AND FOUNDRY MOTORS COMPANY, OF NEW YORK, N. Y., A CORPORATION OF DELAWARE.

MOTOR VEHICLE BUMPER AND MOUNTING THEREFOR.

Application filed June 25, 1927. Serial No. 201,352.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevation of the front end of a chassis frame side member showing the present invention applied thereto;

Fig. 2 is a top plan view of the structure shown in Fig. 1;

Fig. 3 is a view taken on the line 3—3, Fig. 1;

Fig. 4 is a sectional view taken on the line 4—4, Fig. 3; and

Fig. 5 is a side elevation of the end of a chassis frame side member showing a modified form of the invention.

This invention relates to motor vehicle bumpers and mountings therefor, and has as its primary object the provision of a strong and durable mounting for a motor vehicle bumper.

Another object of the invention is to provide a bumper mounting connected to the end of a chassis frame side member.

A still further object is the provision of a bumper mounting which is connected to the end of a chassis frame side member and to the spring shackle immediately adjacent said end.

Other objects and advantages of this invention will be apparent to those skilled in the art from the following description, taken in conjunction with the accompanying drawings, in which 1 indicates a portion of a chassis frame side member, the forward end 2 of which is straight as is usual. Chassis frame side members, as is well known, are generally of channel shape having upper and lower flanges or chords 2' and 3, respectively, and a web 4. The chassis is provided with the usual springs 5 secured to the rear shackle 6 and the forward shackle 7.

More particularly the device of the present invention includes a supporting bracket A secured to the end of the frame member 1 and comprising a head 8 arranged in abutting relation with the extreme end of the frame member and having its lower end extended below said member as clearly indicated in Fig. 1. This supporting bracket A is preferably cast and has a rearwardly extended shoulder 9 formed therewith of a size sufficient to be received within the channel of the side frame member between the upper and lower chords whereby to position the bracket, and further, said bracket is provided with an attaching leg 10 which extends rearwardly from the shoulder adjacent one side thereof. As shown more clearly in Fig. 2 the attaching leg is so arranged that when the bracket is positioned with the head 8 in abutting relation to the end of the frame member 1, the leg 10 lies immediately adjacent the inner face of the web 4 and is attached thereto by rivets 11 or the like; the latter being arranged at different levels in order that said web may not be weakened. In addition to the rivets 11 the head 8 is preferably welded to the end of the side frame member at 12 and for reinforcing purposes the attaching leg 10 is provided with integral ribs 13, see Fig. 2.

Connected to the bracket A by means of bolts 14 is an auxiliary bracket or extension casting B which comprises an attaching head 15 of substantially the same shape as the head 8, and a depending casting extension 16, the lower end of which is bifurcated, as shown clearly in Fig. 3, forming legs 17, the latter terminating in opposed split eyes 18 which are adapted to be positioned on opposite sides of the spring shackle 7 and take the shackle bolt 19, thus affording a rigid connection between the side frame member 1 and the spring 5 or the spring shackle 7. The lower portion of the bracket B is provided with a transverse integral attaching flange 20 arranged just above the eyes 18; the flanges on the opposite sides of the car serving to mount a bumper channel 21 across the front of the vehicle by means of bolts 22 or the like. Clamp bolts 23 extend through the bumper channel and the split eyes 18 for further securing the bumper channel and for securing the eye bolt 19.

The auxiliary bracket is preferably cast to the form illustrated in Fig. 1 whereby to define an attaching portion 24 and from an inspection of Fig. 2 it can be seen that an attaching pad is secured to the portion 24, said pad comprising an angle casting having front and rear portions 26 and 27, respectively, connected by a spacer 28. The rear portion is flanged as shown at 29 to lie adjacent the side of the auxiliary bracket and a web 30 is cast with the front and rear portions for reinforcing purposes.

The pad is secured to the auxiliary bracket by means of a tap bolt 31 which passes through the front and rear portions 26 and 27 and through spacer 28 into a tapped opening in the attaching portion 24. The attaching pad just mentioned is so arranged that its front face and that of the bumper channel 21 are alined, as clearly shown in the drawings.

With the construction just described, it will be apparent that a strong and durable bumper structure of itself is provided, the same comprising the bumper channel 21 and the attaching pads which function really as buffer elements, but I have found it desirable to provide an additional bumper means, and to that end spring tie bumpers 25 and 32 are provided. Referring now to Fig. 1, it can be seen that the spring tie bumpers 25 and 32 are connected to the attaching pads and the bumper channel by means of bolts 31 (heretofore mentioned) and 22 and 33, all of said bolts extending through spring mounts 34 into their respective supports, as clearly indicated in Fig. 2.

Fig. 5 discloses a modification of the invention in which the bracket A is secured to the frame member 1 and which carries the auxiliary bracket B, to the lower end of which the bumper channel 35 is secured in a manner similar to that described with regard to Figs. 1 and 2. In the structure shown in this Fig. 5, it is to be noted that the upper bumper and bumper pad are omitted but I preferably cast with the bracket B an eye 36 which may be used to connect a tow line or for any other purpose desired. It is to be understood that various other elements might be cast integral with the bracket B, if desired, the eye 36 being shown merely by way of example.

It is believed that from the above description the invention will be apparent to those skilled in the art, and it will be obvious that I have provided a bumper and mounting therefor of extremely durable characteristics and one which is easy and comparatively inexpensive to manufacture.

It will further be apparent that with the construction just described, shocks to which the auxiliary bracket may be subjected are transmitted to the bracket or support A from whence they will be imparted to the upper and lower chords and the web of the frame member 1 due to the abutting relation of the head 8 with the extreme end of said frame member.

What is claimed is:

1. In combination with a motor vehicle chassis frame having springs and spring shackles, a bumper mounting comprising a main bracket secured to the chassis frame, and an auxiliary bracket secured to said main bracket and to the spring shackle.

2. A motor vehicle bumper mounting comprising a main bracket secured to the vehicle chassis frame, and an auxiliary bracket rigidly secured to said main bracket and depending therefrom.

3. In combination with a motor vehicle chassis frame having springs and spring shackles, a bumper mounting comprising a main bracket secured to the chassis frame, an auxiliary bracket secured to the main bracket and to said spring shackle, a bumper secured to the lower end of said auxiliary bracket, and a second bumper secured to the auxiliary bracket above the first named bumper.

4. A motor vehicle bumper mounting comprising a main bracket secured to the vehicle chassis frame, an auxiliary bracket secured to the main bracket with its lower end formed into a bumper supporting portion, and an angle casting secured to the auxiliary bracket for supporting a second bumper.

5. A motor vehicle bumper mounting comprising a main bracket having a head portion, a rearwardly extending attaching leg formed with said head, and an auxiliary bracket secured to the head portion and provided with a plurality of bumper attaching sections.

6. A motor vehicle bumper mounting comprising a main bracket having a rearwardly extending attaching leg, an auxiliary bracket having its lower end formed into a bumper attaching portion, and a bumper support attached to said auxiliary bracket above the aforesaid attaching portion.

7. In combination with a motor vehicle chassis frame having a spring and spring shackle, a main bracket having a rearwardly extending attaching leg secured to the chassis frame, an auxiliary bracket secured to the main bracket and having a lower bifurcated end for engagement with the spring shackle on each side thereof, an attaching lug formed with said auxiliary bracket, a bumper secured to said attaching lug, a pad secured to said auxiliary bracket, and a second bumper secured to said pad.

8. In combination with a vehicle chassis frame having a spring connected therewith provided with a spring shackle, a bumper supporting bracket connected to said frame and shackle, spaced bumper channels secured to said bracket, and a spring tie bumper carried by each bumper channel.

9. In combination with a vehicle chassis frame having a spring and spring shackle connected thereto, a bumper supporting bracket connected to said frame and shackle, a pad secured to the bracket intermediate the ends thereof, a bumper channel secured to the bracket, a second bumper channel secured to the pad and alined with the first named bumper channel, and a spring tie bumper secured to each bumper channel.

10. A bumper supporting bracket comprising a casting secured to the chassis frame of a vehicle and having a bifurcated lower end provided with eyes for connection to a spring shackle.

11. In combination with a chassis frame side member, a bracket secured thereto in abutting relation with the end thereof, an auxiliary bracket secured to said first named bracket and depending therefrom, a supporting pad mounted on the auxiliary bracket, a bumper channel secured to the lower end of the auxiliary bracket, and resilient bumpers supported by said pad and bumper channel.

12. In combination with a vehicle chassis frame side member comprising a channel having top and bottom chords and a web, a bracket having a head portion of a size sufficient to abut the chords and web of said frame member whereby to transmit shocks to which said head is subjected directly to said chords and web, and an attaching portion positioned within the channel of the side member, means securing the bracket to said side member, and an auxiliary bumper supporting bracket rigidly secured to the head portion of the first mentioned bracket.

13. A motor vehicle bumper mounting comprising a main bracket secured to the vehicle chassis frame, an auxiliary bracket secured to said main bracket for supporting a bumper, and means secured to said auxiliary bracket for supporting a second bumper.

14. In a motor vehicle having channel side frame members, a bumper mounting comprising a main bracket secured to the end of each side frame member in abutting relation, an auxiliary bracket rigidly secured to each main bracket for supporting a bumper, and means secured to each auxiliary bracket for supporting a second bumper.

15. A motor vehicle bumper mounting comprising a main bracket secured to the vehicle chassis frame, an auxiliary bracket secured to the main bracket and provided with attaching elements, a bumper secured to the auxiliary bracket, and an attaching element secured to the auxiliary bracket for supporting a second bumper.

In witness whereof I have hereunto set my hand.

HUBERT WALKER.